United States Patent
Benevelli et al.

(10) Patent No.: US 9,399,382 B2
(45) Date of Patent: Jul. 26, 2016

(54) ROLL-OVER PROTECTION SYSTEM

(71) Applicant: CNH Industrial America LLC, New Holland, PA (US)

(72) Inventors: Alessandro Benevelli, Albinea (IT); Riccardo Morselli, San Vito di Spilamberto (IT)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/604,950

(22) Filed: Jan. 26, 2015

(65) Prior Publication Data
US 2015/0217619 A1 Aug. 6, 2015

(30) Foreign Application Priority Data
Feb. 3, 2014 (IT) .............................. MO2014A0019

(51) Int. Cl.
| | | |
|---|---|---|
| *B60G 17/056* | (2006.01) | |
| *B60G 9/02* | (2006.01) | |
| *B60G 21/073* | (2006.01) | |
| *B60G 17/015* | (2006.01) | |
| *B60G 17/019* | (2006.01) | |

(52) U.S. Cl.
CPC ............... *B60G 17/056* (2013.01); *B60G 9/02* (2013.01); *B60G 17/019* (2013.01); *B60G 17/0155* (2013.01); *B60G 21/073* (2013.01); *B60G 2200/322* (2013.01); *B60G 2202/154* (2013.01); *B60G 2300/08* (2013.01); *B60G 2300/082* (2013.01); *B60G 2400/106* (2013.01); *B60G 2400/204* (2013.01); *B60G 2400/82* (2013.01); *B60G 2400/842* (2013.01); *B60G 2401/16* (2013.01); *B60G 2600/08* (2013.01); *B60G 2800/0124* (2013.01); *B60G 2800/9124* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,004,265 | A * | 4/1991 | Mizutani ............... | B60G 17/00 280/124.161 |
| 5,044,660 | A * | 9/1991 | Yamamura ......... | B60G 17/0162 267/64.16 |
| 5,080,392 | A | 1/1992 | Bazergui | |
| 5,156,645 | A * | 10/1992 | Tsukamoto ........ | B60G 17/0185 280/5.501 |
| 5,785,344 | A * | 7/1998 | Vandewal .......... | B60G 17/0152 267/64.16 |
| 6,044,921 | A * | 4/2000 | Lansberry ................ | B60G 9/00 180/6.48 |
| 6,129,368 | A * | 10/2000 | Ishikawa ............... | B60G 17/005 188/322.21 |
| 6,308,973 | B1 * | 10/2001 | Griebel .................... | B60G 9/02 280/124.158 |
| 8,352,121 | B2 * | 1/2013 | Bitter ..................... | A01B 63/11 701/36 |
| 2005/0187059 | A1 | 8/2005 | Kroppe | |
| 2008/0100017 | A1 * | 5/2008 | Bitter ................... | B60G 17/005 280/124.16 |
| 2011/0018219 | A1 * | 1/2011 | Oriet ....................... | B60G 5/04 280/124.112 |
| 2011/0187065 | A1 * | 8/2011 | Van Der Knaap | B60G 17/0152 280/5.507 |

FOREIGN PATENT DOCUMENTS

| | | |
|---|---|---|
| CN | 102490565 | 6/2012 |
| CN | 202573706 | 12/2012 |
| EP | 1123894 A2 | 8/2001 |

(Continued)

*Primary Examiner* — Nicole Verley
(74) *Attorney, Agent, or Firm* — Sue C. Watson (57) ABSTRACT

Agricultural vehicle comprising a body to which a front axle is pivotally connected. The agricultural vehicle includes a hydraulic cylinder mounted as a suspension system between the body and the axle. The hydraulic cylinder is fluid-connected, via a steerable valve, to one of an open oil reservoir and an accumulator.

9 Claims, 4 Drawing Sheets

(56) References Cited

FOREIGN PATENT DOCUMENTS

| | | | |
|---|---|---|---|
| EP | 1541773 | A2 | 6/2005 |
| EP | 2444344 | A1 | 4/2012 |
| FR | 2058788 | A5 | 5/1971 |
| GB | 1090674 | A | 11/1967 |

\* cited by examiner

ROLL-OVER PROTECTION SYSTEM

CROSS REFERENCE TO RELATED APPLICATIONS

This application claims priority to Italian Patent Application Serial No. MO2014A000019, entitled, "Roll-over protection system", filed Feb. 3, 2014, which is incorporated by reference herein in its entirety for all purposes.

TECHNICAL FIELD

The present invention relates to an agricultural vehicle with a body to which a front axle is pivotally connected. Particularly, the invention relates to a roll-over protection system for such agricultural vehicle.

BACKGROUND

Agricultural vehicles, such as tractors, are equipped with a pivoting front axle to improve the comfort and to increase the stability of the tractor on the field. Furthermore, such a pivoting front axle assures that the rear wheels of the tractor (typically the powered wheels) are in touch with the ground surface at all times to assure a proper traction.

The main cause of tractor crashes is overturning (roll-over). When the tractor is driven over steep slopes or uneven ground, overturning can occur. Thereby, the pivoting front axle significantly decreases the stability of the tractor in an overturning situation. From a safety point of view, overturning is a big issue for agricultural vehicles with a pivoting front axle.

EP 2 444 304 describes an active anti roll-over system. Thereby, a hydraulic cylinder is placed between the pivoting front axle, and the body of the agricultural vehicle. The hydraulic cylinder is connected to a hydraulic circuit so that a predetermined force can be applied to the cylinder in a roll-over situation, to increase the stability of the agricultural vehicle. A drawback of this anti roll-over system, is that it requires power to operate the hydraulic system (a hydraulic pump is essential in the proposed system, hence the roll-over system is active). When the engine of the agricultural vehicles stalls and power is lost, then the anti roll-over protection system will not work, resulting in an unsafe situation.

EP 1 541 773 describes a passive anti roll-over system. Particularly, it describes a wheel type construction machine having a hydraulic suspension system. Thereby, the hydraulic cylinders, operating as suspension system, are connected to an accumulator (to obtain the suspension effect). When a roll-over situation is detected, the system of EP 1 541 773 cuts the connection between the cylinder and the accumulator, so that further movement of the cylinder is blocked. In this manner, a passive anti roll-over system is obtained. The anti roll-over system does not comprise a hydraulic pump that depends on external energy, and can be activated via a signal (to switch a valve). Therefore this system is operable even when the agricultural vehicle stalls and power is lost. A drawback of this passive anti roll-over system is that it is not designed for a pivoting front axle. Particularly, this passive anti roll-over system does not comprise a state wherein no force is applied to the hydraulic cylinders, which is required to allow the front axle to freely pivot.

It is an object of the present invention to provide a passive anti-rollover system to an agricultural vehicle having a pivoting front axle.

SUMMARY OF THE INVENTION

To this end, the invention provides in an agricultural vehicle comprising a body to which a front axle is pivotally connected, wherein a hydraulic cylinder is mounted as a suspension system between the body and the axle, wherein the hydraulic cylinder is fluid connected, via a steerable valve, to one of an open oil reservoir and an accumulator.

By providing a hydraulic cylinder between the pivoting axle and the body of the vehicle, the pivoting movement of the axle can be influenced. However, when the hydraulic cylinder is connected to an open fluid reservoir, the pivoting movement is (deliberately) not influenced. In such state of the hydraulic system, the axle can freely pivot, thereby obtaining a maximum comfort and traction. Considering the fact that only in a minority of situations, roll-over is an issue, this state of the hydraulic system where the cylinder does not influence the pivoting movement, is an advantage. When the cylinder is otherwise connected to the accumulator (which is possible via the valve), the hydraulic cylinder operates as a spring that builds up tension and counter pressure against a movement of the cylinder (this state of the hydraulic system being referred to as the anti roll-over state). When the anti roll-over state is activated, further pivoting of the axle will result in a pressure that is built up in the accumulator and cylinder which will act as a counterforce against further rotation of the axle. Thereby, roll-over protection is obtained. It will be clear that the counterforce is not a result of a hydraulic pump providing energy to the cylinder. There is no energy input required to obtain a roll-over protection. By simply controlling the valve, the roll-over protection can be activated and deactivated. In this manner, the present invention provides in a passive roll-over protection adapted for agricultural vehicles with a pivoting axle.

The passive roll-over protection system is activated when a risk of roll-over is detected. The passive roll-over protection system is deactivated when the roll-over risk is gone. For example, a pressure sensor may measure the pressure in the hydraulic system and deactivate the roll-over protection system, i.e. switch the appropriate valves, when the pressure drops below a threshold. Alternatively, the roll-over protection system may be deactivated when a position sensor or roll sensor detects that the vehicle rolls back to a stable position.

Preferably, the steerable valve is fluid connected to the open oil reservoir and is fluid connected to the accumulator and is provided to selectively connect the hydraulic cylinder to one of the open oil reservoir and the accumulator. Thereby, the precise position of the valve with respect to the cylinder, the open oil reservoir and the accumulator is defined. Furthermore, it is made explicitly clear that the valve can be switched between a first position of the valve wherein the cylinder is connected to the open oil reservoir and a second position of the valve wherein the cylinder is connected to the accumulator.

Preferably, a damping element is provided between the accumulator and the valve. By providing a damping element, spring resonance (the spring function being provided by the accumulator) is minimized Thereby, stability of the agricultural vehicle when the hydraulic system is in roll-over state, is improved.

Preferably, the damping element is bypassed, wherein the bypass comprises a one-way valve, so that the damping is only obtained when fluid flows towards the accumulator, and wherein damping element is bypassed when fluid flows out of the accumulator. In this manner, a one-way damping function is obtained. This one-way damping ensures that emptying of the accumulator is not slowed down via the damping element. Namely, when the accumulator is emptied, the fluid can flow through the bypass, towards the cylinder. Thereby, it is avoided that a wheel of the pivoting axle loses contact with the ground surface because the hydraulic cylinder fails to follow the movement of the axle (which could be the case of the damping element was not bypassed).

Preferably, a steerable relief valve is provided between the open oil reservoir and the accumulator. Via the steerable relief valve, the pressure at the accumulator can be relieved via connection with the open oil reservoir. Thereby, a simple deactivation mechanism is provided for deactivating the roll-over protection. When one of the components of the hydraulic system, for example a valve, would fail, then the roll-over system can be deactivated via this steerable relief valve. Thereby, it can be prevented that a malfunctioning roll-over system affects the basic operation of the agricultural vehicle.

Preferably, an overpressure detection mechanism is provided at the accumulator, which overpressure detection mechanism is operationally connected to an overpressure valve that is provided between the accumulator and the open oil reservoir, wherein the overpressure detection mechanism is provided to open the overpressure valve when overpressure is detected. Via the overpressure detection mechanism, and the overpressure valve, system failure as a result of overpressure can be prevented by relieving the pressure at the accumulator via connection with the open oil reservoir.

Preferably, the hydraulic cylinder forms part of two symmetrically mounted hydraulic cylinders, wherein the two cylinders are cross-connected. Thereby, cross-connection is particularly relevant for double-acting cylinders, and means that an upper end of a first cylinder is connected to a lower end of a second cylinder, and a lower end of the first cylinder is connected to an upper end of the second cylinder. When the hydraulic cylinders are symmetrically mounted, forces applied by the cylinders are equally divided over the vehicle, so that stresses in the axle material and in the body of the agricultural vehicle are minimized.

Preferably, the hydraulic cylinder is a double acting cylinder and a first side of the double acting cylinder is fluid connected via the steerable valve, and a second side of the double acting cylinder is fluid connected via a further steerable valve, to one of the open oil reservoir and the accumulator. By providing two steerable valves, roll-over can be countered in two rotational directions. Furthermore, although the roll-over can be countered in two directions, using two valves, still a single accumulator in the hydraulic system will be sufficient.

Preferably, a roll-over sensor is operationally connected to the steerable valve. In the art, multiple roll-over sensors are known. By providing a roll-over sensor to the steerable valve, and optionally also to the further steerable valve when this further valve is provided in the hydraulic system, the roll-over protection can operate automatically.

The invention further relates to a method for protecting an agricultural vehicle against roll-over, the vehicle comprising a body to which a front axle is pivotally connected, wherein a hydraulic cylinder is mounted as a suspension system between the body and the axle, wherein the hydraulic cylinder is fluid connected via a steerable valve to one of an open oil reservoir and an accumulator, the method comprising the steps of:

sensing a roll-over state of the agricultural vehicle;
steering the valve in a position to connect the cylinder with the accumulator.

Thereby, preferably the method further comprises the steps of sensing a safe state of the agricultural vehicle and steering the valve in a position to connect the cylinder with the open oil reservoir when the safe state is sensed.

Via the method according to the invention, an agricultural vehicle provided with a pivoting front axle is provided with a passive roll-over protection system. Thereby, the front axle can freely pivot in a safe state of the vehicle, and in a roll-over state of the vehicle, a suspension is activated by connecting the hydraulic cylinder to the accumulator via the valve. Thereby, a passive roll-over protection is obtained that is optimized for agricultural vehicles with pivoting front axles.

BRIEF DESCRIPTION OF THE DRAWINGS

The invention will now be described in more details with respect to the drawings illustrating some preferred embodiments of the invention. In the drawings.

In the drawings a same reference number has been allocated to a same or analogous element.

DETAILED DESCRIPTION OF THE EMBODIMENT(S)

Agricultural vehicles 1 are designed to be used on a rough terrain. A rough terrain is a terrain with an uneven ground surface and/or unstable ground surface. An unstable ground surface is typically the result of fluid, semi-fluid or viscous ground surface materials such as dirt, sand or similar materials. An agricultural vehicle is provided with large wheels compared to regular vehicles, so that the agricultural vehicle can move well on these rough terrains. Furthermore, the agricultural vehicle is provided with a pivoting front axle. This pivoting front axle improves the comfort and prevents the rear wheels from losing traction.

On rough terrains, as a result of uneven ground surfaces, roll-over of an agricultural vehicle is a known risk. To prevent an agricultural vehicle from rolling-over, the track width of the vehicle, determined by the distance between left vehicle wheels and right vehicle wheels is enlarged compared to regular vehicles. However in extreme circumstances, this adaptation might not be enough to prevent roll-over due to the pivoting front axle. It is an object of the present invention to provide an agricultural vehicle with a high roll-over resistance.

Figure 1:
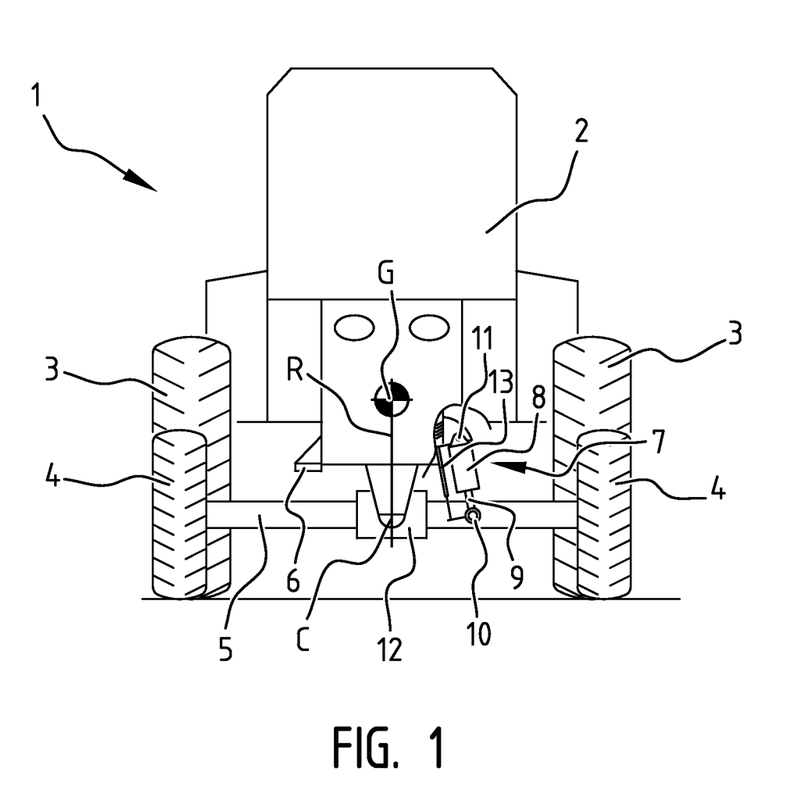
FIG. 1 shows a principle structure of an agricultural vehicle according to an example of the invention.

The vehicle 1 comprises a body 2 to which a pair of rear wheels 3 are connected. The rear wheels 3 are powered by the engine of the vehicle via a rear shaft (not shown) connecting the wheels 3 with the body 2 in a substantially rigid manner (meaning with no significant suspension means between the wheel and the body). The vehicle 1 is further provided with a pair of front wheels 4 connected to the body 2 of the vehicle via a front shaft 5 (being the front axle). The front shaft is hingingly connected to the vehicle body (to obtain the pivoting front axle) thereby enabling the front shaft 5 to oscillate with respect to the body 2 around a longitudinal axis of the vehicle, being an axis that is substantially parallel to the straight moving direction of the vehicle. The oscillation movement of the front shaft 5 with respect to the body 2 is limited by stop elements 6.

The general principle is that a resting body remains in a stable equilibrium if the resultant of the forces acting thereon is directed to a resting surface and meets the resting surface inside the resting polygon. In the case of a vehicle 1, the vehicle is subject to the single or combined effects of centrifugal forces (due to curved trajectories), of lateral and/or longitudinal slopes, and of external forces, all of which can influence the stability. A combination of these effects might in certain circumstances result in an unstable situation wherein for example a rear wheel is lifted up from the ground (prelude to roll-over).

It should be noted that, at least until the front shaft reaches the oscillation end-of-stroke limits defined by the stop elements 6, the stability of the vehicle, in terms of lateral overturning (roll-over), is ensured only by the rear wheels 3. Namely the hingingly connected front shaft 5 provides no resistance against lateral roll (due to the hinge). Therefore from a stability point of view, the tractor with pivoting front axle is equivalent to a three-wheeled vehicle with only one front wheel.

If the rear wheels 3 rest on a tilted and/or unstable ground surface, the body 2 of the vehicle 1 might rotate with respect to the front shaft 5 around the hinge connection C. This rotation may cause one of the rear wheels to lift up from the ground. By lifting of one of the rear wheels, the resting triangle (three-wheeled vehicle) degenerates in a resting straight line. Through the effect of the rotation of the body 2 of the vehicle 1 with respect to the front shaft 5 and of the lifting of the rear wheel 3, the centre of gravity G of the vehicle rotates around an axis coinciding with said straight line. Through the effect of said rotation, the centre of gravity G rises and, simultaneously, moves towards said straight line (being an edge of the resting triangle). When the center of gravity passes the resting straight line, i.e. exits from the resting triangle, the vehicle 1 overturns.

The roll-over dynamics of the vehicle 1 are nevertheless influenced by the fact that the oscillation of the front shaft 5 with respect to the body 2 is limited to a predetermined angle (by the stop elements 6). When the stop elements 6 come into contact with the front shaft 5 (when the stop elements are mounted on the vehicle body as is shown in the figure) or with the vehicle body (when the stop elements are mounted on the front shaft as is not shown in the figure), further rotation of the body 2 of the vehicle 1 with respect to the front shaft 5 is prevented. Typically, this occurs before the center of gravity passes the resting straight line, i.e. before the vehicle 1 has reached limit balance condition.

When the stop elements 6 prevent further rotation of the front shaft 5, the latter becomes a supporting point to the body 2 of the vehicle 1. As a result, the resting triangle is reconfigured since the earlier central front supporting zone is shifted towards the location of the stop element or the location of the wheel. The balance of the vehicle will thus be ensured up to the moment that the center of gravity exceeds the newly defined resting triangle. Thus apparently the stop elements 6 seem to be able to prevent overturning of the vehicle. Nevertheless, it must be considered that rotation of the body 2 of the vehicle 1 with respect to the front axle 5 is a dynamic phenomenon. This means that when the stop elements 6 come into contact with the front axle 5, locking the rotation of the body 2 of the vehicle 1 with respect to said front axle 5, the inertia forces acting on the vehicle can continue the side rotation of the vehicle, still causing overturning of the vehicle 1.

Figure 2:
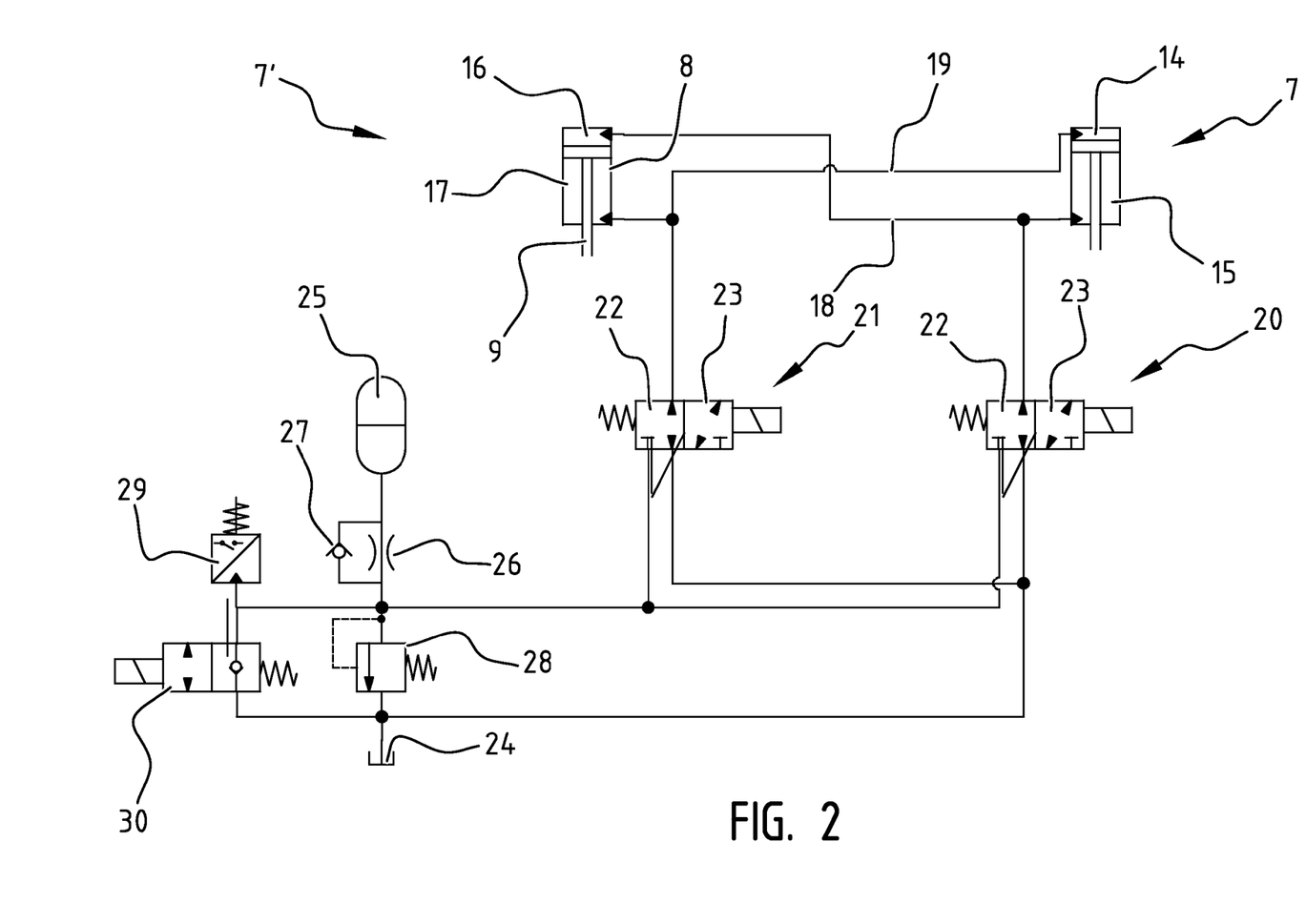
FIG. 2 shows a hydraulic system according to a preferred embodiment of the invention.

The rollover protection system according to the present invention comprises an actuator 7, for example a double-acting hydraulic cylinder, which is interposed between the front axle 5 and the body 2 of the agricultural vehicle 1. The actuator 7 comprises an actuator body 8 connected to the body 2 of the vehicle 1 by a first rotating connection 11, and a stem 9 connected to the front axle 5 via a second rotating connection 10. Thereby, the actuator 7 is able to exert controllable forces on the front axle 5 to counteract a rotation of the front axle 5 with respect to the body 2 of the agricultural vehicle 1. The invention provides in a specific hydraulic system for connecting the actuator thereby implementing the roll-over protection, which system is shown in FIG. 2, and explained in further detail hereunder. It will be clear however that this hydraulic system is combinable with other hydraulic systems that are known in the prior art, to implement further functionalities. Although FIG. 1 shows an agricultural vehicle with only one actuator 7, it will be clear that an agricultural vehicle 1 can be provided with two actuators 7 that are symmetrically placed so that forces can be transmitted between axle and body in a balance manner.

FIG. 2 shows an hydraulic circuit diagram wherein a system according to a preferred embodiment of the invention is shown. The skilled person will recognize that other embodiments of the invention will operate based on the same principles as will be explained hereunder. The figure shows a first hydraulic cylinder 7, and a second hydraulic cylinder 7'. These cylinders 7, 7' represent the actuators 7 of FIG. 1 that are placed between the axle 5 and the body 2 of the agricultural vehicle 1 (the two cylinders being placed in a symmetric manner with respect an the upright plane comprising the axis parallel to the forward direction of travel of the tractor). The first cylinder 7 and the second cylinder 7' are preferably double acting hydraulic cylinders. The double acting hydraulic cylinders 7, 7' are cross-connected. This means that a first hydraulic chamber 14 of the first cylinder 7 is fluid connected via a first cross-connector 19 to a second hydraulic chamber 17 of the second cylinder 7', and that a second hydraulic chamber 15 of the first cylinder 7 is fluid connected via a second cross-connector 18 to a first hydraulic chamber 16 of the second cylinder 7'. Since the cylinders 7 and 7' are symmetrically placed on the agricultural vehicle, extending of the first cylinder 7 implies retraction of the second cylinder 7' and vice versa. Therefore, cross-connecting of the double acting cylinders 7, 7' doubles the hydraulic movement (instead of ejecting fluid from/injecting fluid in one hydraulic chamber, fluid is simultaneously ejected from/inserted in two hydraulic chambers). Due to the cross-connection of the hydraulic cylinders 7, 7' two pairs of hydraulic chambers can be defined, the first pair being formed by chambers 14 and 17, and the second pair being formed by the chambers 15 and 16. The first pair of hydraulic chambers 14, 17 are connected to a first valve 21, and the second pair of chamber 15, 16 are connected to a second valve 20. Each valve 20, 21 comprises a first state 22 and a second state 23. The valves 20, 21 used may, e.g., be regular three-way valves.

In the first state 22 of the valve 20, 21, the pair of chambers is directly connected to an oil reservoir 24. This oil reservoir 24 is an open oil reservoir 24. This does not necessarily mean that the oil in the reservoir 24 is in direct contact with the environmental air. Open oil reservoir 24 is defined as an oil reservoir where the oil pressure is substantially equal to one bar (being the environmental air pressure). This means that when the valves 20, 21 are in the first state 22, each of the chambers of the hydraulic cylinders 7, 7' are set at approximately 1 bar. This means that no significant counter pressure is exerted by the hydraulic cylinder 7, 7' to rotation of the axle 5, and that therefore the axle 5 can freely pivot.

In the second state 23 of the valve 20 or 21 the respective chambers of the hydraulic cylinders 7, 7' are fluid connected to an actuator 25. In an anti-rollover situation, one of the valves 20, 21 is in the second state, while the other valve is in the first state 22. Which of the valves 20, 21 is in a second state depends on the rollover direction (clockwise or counter clockwise). When one of the pair of chambers is connected to the accumulator 25 by setting the respective valve in the second state 23, fluid that flows out of the hydraulic chambers of the cylinders 7, 7', flows into the accumulator 25 thereby building up hydraulic pressure. Due to this built-up of hydraulic pressure further rotation of the axle 5 is countered with a gradually increasing counterforce. Thereby, further rotation of the axle 5 is countered and rollover is prevented.

Figure 4:
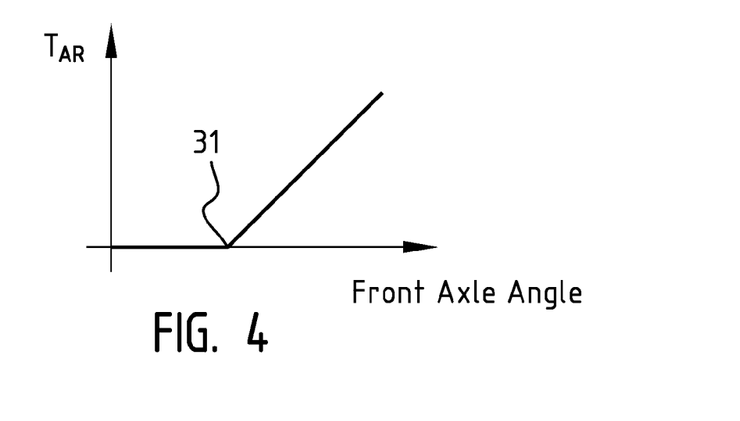
FIG. 4 shows a graph illustrating the effect of switching a valve of the hydraulic system of FIG. 2.

The effect of the two states 22, 23 of the valves 20, 21 is illustrated in FIG. 4. FIG. 4 shows on the horizontal axis, the front axle angle, while on the vertical axis it shows the counterforce against further rotation of the axle 5. The graph shows a line with a kink 31. On the left-hand side of the kink 31, there is no significant counterforce against pivoting of the axle. At the kink 31, a valve (20 or 21) is switched from first state 22 to second state 23 to connected respective chambers of the first and second cylinder 7, 7' to the accumulator 25. This will result in an increase of counterforce against further rotation, shown in the graph of FIG. 4 on the right-hand side of the kink 31. In this manner, an anti-rollover system is obtained where the axle can freely pivot when the agricultural vehicle is in a safe state, and rollover is prevented in a passive manner (without hydraulic pump) when the agricultural vehicle is in a rollover state. When the tractor comes back to the original position (pivot angle=0 degrees), even if the three way valve will be still engaged, zero anti-rollover torque is applied to the axle. When the accumulator will be emptied, the piston, that is still moving, will be able to suck oil from the reservoir without introducing any opposite torque on the axle. This will be explained in more detail hereunder.

A damping element 26 is provided in the fluid connection between the valves 20, 21 and the accumulator 25. The damping element creates a resistance against flowing of the fluid towards the accumulator 25. Thereby, resonance that might occur in the accumulator (equivalent to spring resonance) is avoided. The damping element 26 is preferably bypassed, wherein the bypass comprises a one-way valve 27. Due to the bypass with one-way valve 27, the damping element 26 only creates a resistance against flowing of the fluid in one flow direction, being the flow direction towards the accumulator 25. Via such a combination of elements, rotation of the axle can be countered (when one of the valves 20, 21 is in the second state 23), whereby the pressure built-up is damped to avoid resonances, while a returning rotation of the axle (where fluid flows from the accumulator 25 back to the chambers of the cylinders 7, 7') does not encounter significant damping (resistance) since the fluid can flow via the bypass and one-way valve 27. This ensures that in a returning rotational movement of the axle, the front wheels remain in contact with the ground surface, and are not lifted up due to the damping element preventing fluid from flowing back into the hydraulic chambers of the cylinders 7, 7'. In practice, the damping element 26 and bypass with one-way-valve 27 can be integrated into the accumulator An overpressure valve 28 is placed between the accumulator 25 and the open oil reservoir 24. More preferably, the overpressure valve 28 is placed between the damping element 26 and the open oil reservoir 24. This overpressure valve 28 is provided to connect the open oil reservoir 24 with the accumulator 25 when an overpressure occurs. Thereby, this overpressure valve 28 protects the hydraulic system, particularly the accumulator 25, fluid connection between the accumulator 25 and the valves 21, 20, and the hydraulic chambers of the cylinders 7 and 7', against overpressure.

Preferably, a further hydraulic valve 30 is provided between the accumulator 25 and the open oil reservoir 24. This further hydraulic valve 30 is more preferably placed between the damping element 26 and the open oil reservoir 24. The further hydraulic valve 30 comprises two states, a first state with a one-way valve allowing fluid to flow from the oil reservoir to the accumulator 25, and preventing hydraulic fluid from flowing towards the open oil reservoir 24. Via this state, underpressure at the accumulator 25 is prevented. Namely, an underpressure situation would open the one-way valve so that fluid can flow from the open oil reservoir 24 to the accumulator 25. In the second state of further hydraulic valve 30, the accumulator 25 is connected to the open oil reservoir 24 (allowing fluid to flow in two directions). Thereby, in this state, built-up of pressure in the accumulator 25 is prevented via the connection with the open oil reservoir 24. This further hydraulic valve can be switched to the second state when a problem occurs with one of the valves 20, 21. Malfunctioning of a valve 20, 21 could result in an unwanted built-up of pressure in the hydraulic cylinders, and a corresponding unwanted resistance against rotation of the front axle 5. By switching the further hydraulic valve 30 to the second state, the accumulator is connected to the open oil reservoir, and built-up of pressure is prevented, even if one of the valves is in the second state 23. Thereby, via this further hydraulic valve 30, the rollover system can be disengaged.

The hydraulic system further comprises a pressure sensor 29 provided for measuring a pressure at the accumulator 25. Thereby, the pressure sensor 29 is mounted between the valves 20, 21, and the accumulator 25 so that when one of the valves 20, 21 is in the second state 23 (connecting respective hydraulic chambers of the cylinders 7, 7' to the accumulator 25), the pressure sensor 29 is provided to measure the pressure in the hydraulic chambers of the cylinders 7, 7'. This allows the pressure sensor 29 to measure the increase and decrease of pressure in the chambers from the moment that the respective valve is switched to the second state 23. Via this pressure sensor 29, the moment where the axle 5 returns to the rotational position where the rollover protection system has been activated, can be detected (when the pressure that has previously increased is decreased to approximately 1 bar). At this moment, the valve 20, 21 that has been switched to the second state 23, can be switched back to the first state 22 to disengage the rollover protection. Further operation of the system of FIG. 2 will be further described in relation to FIG. 3.

Figure 3:
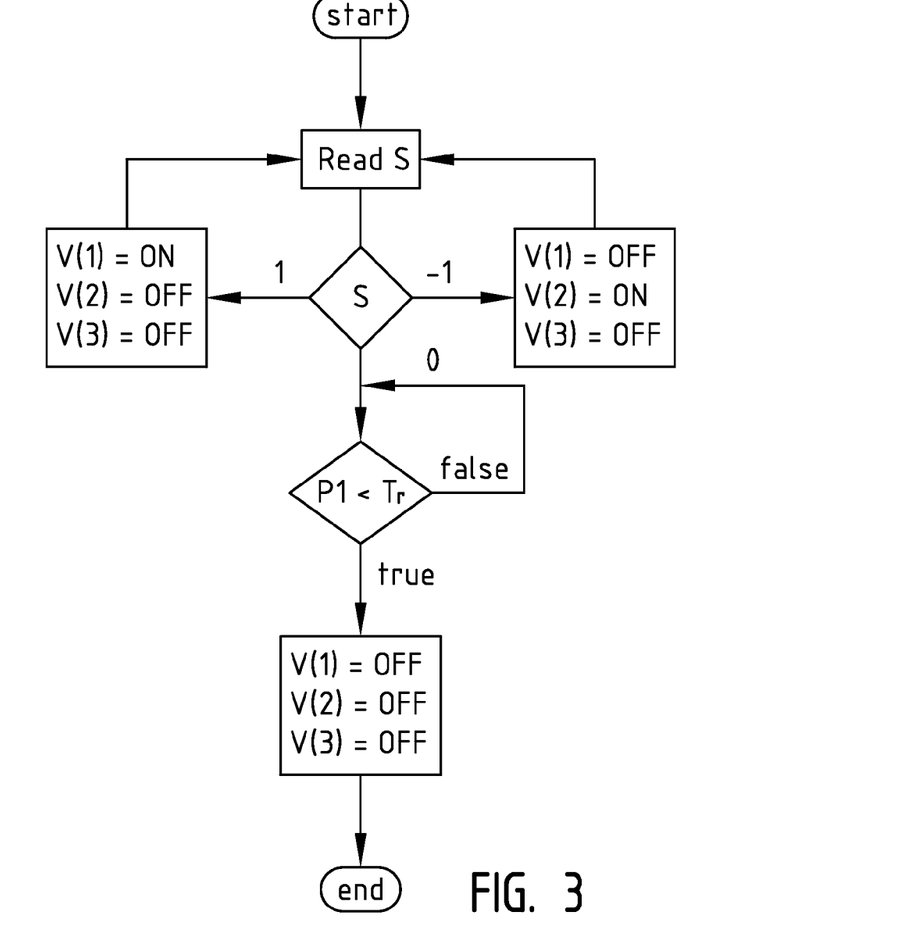
FIG. 3 shows a flowchart illustrating preferred operation of the hydraulic system of FIG. 2.

FIG. 3 shows a flowchart for activating and deactivating the rollover prevention system. The first step is reading the rollover sensor. In the present application, the rollover sensor is not described in detail, since multiple (pre-)rollover sensors and (pre-)rollover detection systems are known in the prior art. The present invention is applicable in combination with any of the known rollover detection systems. For simplicity in the flowchart of FIG. 3, the rollover detection system S outputs '0' when no rollover state is detected, outputs '1' when a (pre-)rollover state in clockwise direction is sensed, and outputs '−1' when a (pre-)rollover state in counterclockwise direction is detected. The skilled person will recognize that different sensors or combination of sensors can be used to decide on the rollover state or pre-rollover state. When the sensor detects a rollover state in clockwise direction (output 1), the first valve V(1) (for example being the valve 20 in FIG. 2) is activated (meaning being set in the second state 23), while the second valve V(2) (for example valve 21 of FIG. 2) remains deactivated (being in the first state 22). The further hydraulic valve V(3) remains in the deactivated state (this valve being valve 30 of FIG. 2). When the valves are set in such a manner, further rotation of the axle 5 will be countered by a force that gradually builds up in the accumulator 25, thereby rollover in the clockwise direction is prevented.

When the sensor measures a rollover situation in the counterclockwise direction (S=−1), the other one of the two valves V(2) (for example in FIG. 2 valve 21) is engaged while the first one of the valves V(1) and the further hydraulic valve V(3) remain disengaged. Thereby, further rotation of the axle 5 will be countered and rollover is prevented.

When the rollover sensor S outputs 0, meaning that no rollover situation is detected, the pressure is measured via pressure sensor 29 and compared with a threshold value. If the pressure appears to be above a threshold value, a pressure is built up in the accumulator to counter a previously detected rollover situation. Such situation is indicated in the flowchart of FIG. 3 via the arrow 'false'. When the pressure measured via the pressure sensor 29 is smaller than a threshold value, all valves are pressure-free. In such a situation, even if a rollover situation has previously been detected, the axle 5 has returned to a position so that no counterforce is applied to the axle 5. Thereby, it will be clear that the counterforce that acts on the axle is directly related to the pressure that is measured via pressure sensor 29. If no counterforce is applied to the axle 5, all the valves in the rollover system can be disengaged so that the axle 5 can freely rotate with respect to the body 2 of the agricultural vehicle 1. FIG. 4 shows on the left-hand side of kink 31 the situation where S=0 and where P1<threshold Tr. At the kink 31, a rollover situation is detected and one of the first and second valves 20, 21 is engaged into the second state 23 so that pressure is built up when the axle 5 rotates further. When the front axle returns (from the right-hand side towards the left-hand side in the graph), the pressure gradually decreases until point 31 is reached again, at this moment, because a return to the stable situation is detected, all valves can be set to the disengaged state. Alternative ways of detecting a return to the stable situation may be using a position sensor, angle sensor or roll sensor for detecting when the vehicle rolls back to a stable position.

Figure 5:
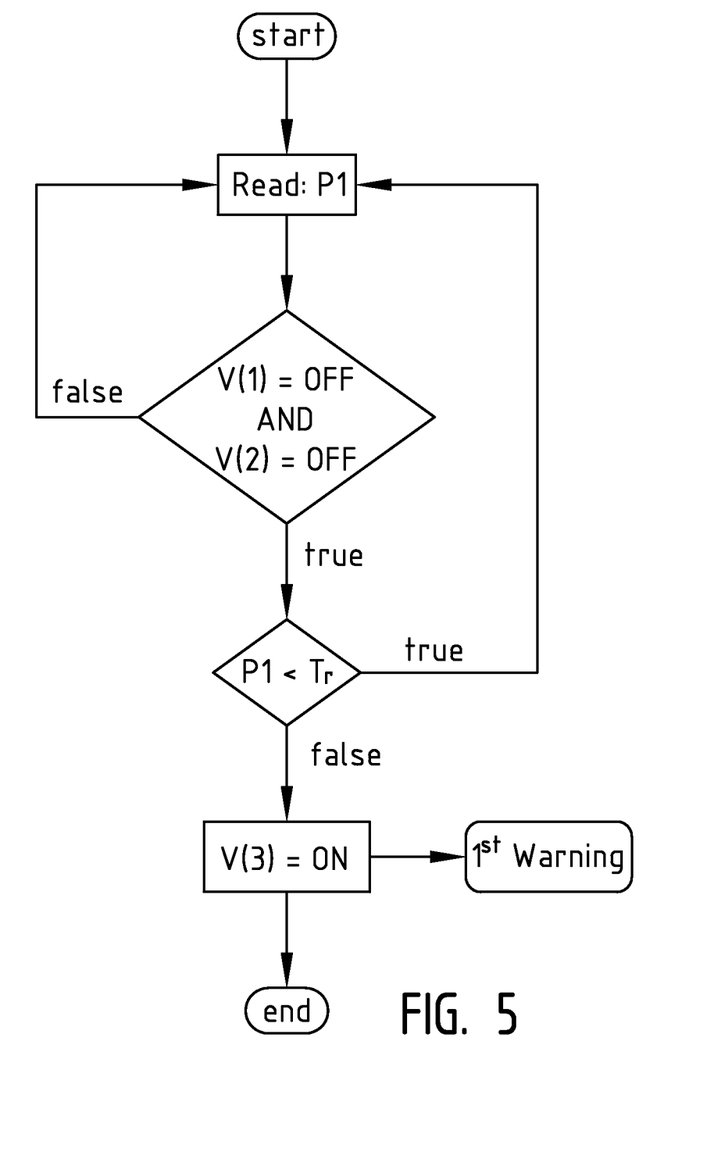
FIG. 5 shows a flowchart illustrating failure detection in the hydraulic system of FIG. 2.

FIG. 5 shows an error detection method in the hydraulic system of FIG. 2. This method starts with reading the pressure at pressure valve 29. When one of the valves 20, 21 is engaged (meaning that V1=off and V2=off=false), the hydraulic system is building up pressure and an increased pressure at pressure sensor 29 is normal. However, when the valves 20, 21 are both in the disengaged state 22, an increased pressure at the pressure sensor 29 indicates that an error has occurred in the hydraulic system. At this moment, the further hydraulic valve can be engaged to connected the accumulator 25 to the open oil reservoir 24. When this further valve is engaged, a warning is sent to the operator of the agricultural vehicle to notify the operator that the rollover protection system is not working properly. An example of an error that can occur (to arrive in such a situation of the rollover protection system not working properly) is failure of a valve 20, 21. When such valve fails to return to the first state when the valve is disengaged, pressure can build up in the system while such pressure is not intended or not wanted. In this manner, the rollover protection system can be disengaged via the further hydraulic valve 30. In such situation, the axle 5 can freely pivot despite one of the valves 20, 21 being physically in the second state.

It will be clear to the skilled person that use of the term freely pivot does not mean that there is no resistance against pivoting of the axle 5. Even when the valves are disengaged and the hydraulic chambers of the cylinders 7, 7' are connected to the open oil reservoir, then still displacing fluid from the chambers to the open oil reservoir will result in some resistance. However, this resistance is small compared to the situation where pressure is built up in the accumulator 25.

The above described embodiments and the shown figures are illustrative and serve only for a better understanding of the invention. The invention is not limited to the described embodiments. Different alternatives, and preferred features described in the text can be freely combined by a skilled person and developed in more detail to form an operational whole without departing from the claimed invention. The scope of protection of the invention will therefore be defined solely by the claims.

The invention claimed is:

1. Agricultural vehicle comprising a body to which a front axle is pivotally connected, wherein a hydraulic cylinder is mounted as a suspension system between the body and the axle, the agricultural vehicle further comprising
a hydraulic system comprising
the hydraulic cylinder and a steerable valve provided to selectively connect the hydraulic cylinder to one of an open oil reservoir and an accumulator, a damping element provided between the accumulator and the steerable valve, wherein the hydraulic system is operative to control the steerable valve to connect the hydraulic cylinder to the accumulator when a rollover situation is detected and to connect the hydraulic cylinder to the open oil reservoir when return from the rollover situation to a stable situation is detected.

2. Agricultural vehicle according to claim 1, wherein the hydraulic system further comprises a pressure sensor for measuring a pressure in the hydraulic system.

3. Agricultural vehicle according to claim 2, wherein the hydraulic system is operative to control the steerable valve to connect the hydraulic cylinder to the accumulator when the rollover situation is detected and to connect the hydraulic cylinder to the open oil reservoir when the pressure in the hydraulic system is below a threshold value.

4. Agricultural vehicle according to claim 1, wherein the damping element is bypassed when fluid flows away from the accumulator, the fluid flowing to a bypass which comprises a one-way-valve so that damping is only obtained when fluid flows towards the accumulator.

5. Agricultural vehicle according to claim 1, wherein a steerable relief valve is provided between the open oil reservoir and the accumulator.

6. Agricultural vehicle according to claim 5, wherein an overpressure detection mechanism is provided at the accumulator, which overpressure detection mechanism is operationally connected to an overpressure valve that is provided between the accumulator and the open oil reservoir, wherein the overpressure detection mechanism is provided to open the overpressure valve when an overpressure is detected.

7. Agricultural vehicle according to claim 1, further comprising a rollover sensor operationally connected to the steerable valve.

8. Agricultural vehicle comprising a body to which a front axle is pivotally connected, wherein a hydraulic cylinder is mounted as a suspension system between the body and the axle, the agricultural vehicle further comprising
a hydraulic system comprising
the hydraulic cylinder and a steerable valve provided to selectively connect the hydraulic cylinder to one of an open oil reservoir and an accumulator, wherein the hydraulic system is operative to control the steerable valve to connect the hydraulic cylinder to the accumulator when a rollover situation is detected and to connect the hydraulic cylinder to the open oil reservoir when return from the rollover situation to a stable situation is detected,
wherein the hydraulic cylinder forms part of two symmetrically mounted hydraulic cylinders, wherein the two cylinders are cross-connected, and wherein the hydraulic cylinder is a double-acting cylinder and wherein a first side of the double-acting cylinder is fluid-connected via the steerable valve, and wherein a second side of the double-acting cylinder is fluid-connected via a further steerable valve, to one of the open oil reservoir and the accumulator.

9. Agricultural vehicle according to claim 8, wherein the agricultural vehicle has a free state wherein the steerable valve and the further steerable valve are both connecting the cylinder with the open oil reservoir, and has an anti-rollover state wherein only one of the steerable valve and the further steerable valve is connecting the cylinder with the accumulator.

* * * * *